United States Patent
Lin et al.

(10) Patent No.: US 12,510,565 B2
(45) Date of Patent: Dec. 30, 2025

(54) METHOD FOR PRODUCING A PROBE CARD

(71) Applicant: Exaddon AG, Buchberg (CH)

(72) Inventors: Kun-Hsien Lin, Zhubei (TW); Edgar Hepp, Zurich (CH); Wabe Koelmans, Adliswil (CH); Patrik Schuerch, Suhr (CH)

(73) Assignee: EXADDON AG, Buchberg (CH)

( * ) Notice: Subject to any disclaimer, the term of this patent is extended or adjusted under 35 U.S.C. 154(b) by 103 days.

(21) Appl. No.: 18/261,465

(22) PCT Filed: Feb. 18, 2022

(86) PCT No.: PCT/EP2022/054086
§ 371 (c)(1),
(2) Date: Jul. 13, 2023

(87) PCT Pub. No.: WO2022/175458
PCT Pub. Date: Aug. 25, 2022

(65) Prior Publication Data
US 2024/0110948 A1    Apr. 4, 2024

(30) Foreign Application Priority Data

Feb. 22, 2021    (CH) .................................. 00176/21

(51) Int. Cl.
*G01R 3/00*    (2006.01)
*B33Y 10/00*    (2015.01)
(Continued)

(52) U.S. Cl.
CPC ............... *G01R 3/00* (2013.01); *B33Y 10/00* (2014.12); *B33Y 80/00* (2014.12);
(Continued)

(58) Field of Classification Search
CPC ......................................................... G01R 3/00
See application file for complete search history.

(56) References Cited

U.S. PATENT DOCUMENTS 6,084,420 A * 7/2000 Chee .................. G01R 1/06716
324/755.06
6,491,968 B1 * 12/2002 Mathieu ............. G01R 1/06727
156/941

(Continued)

FOREIGN PATENT DOCUMENTS

| CN | 2840049 Y | 11/2006 |
| JP | 2007-121198 A | 5/2007 |

(Continued)

OTHER PUBLICATIONS

European Patent Office, International Search Report for PCT/EP2022/054086, Jun. 24, 2022, three (3) pages, The Netherlands.

(Continued)

*Primary Examiner* — Steven L Yeninas
(74) *Attorney, Agent, or Firm* — Amster, Rothstein & Ebenstein LLP

(57) ABSTRACT

A method for producing a probe card comprises the steps of: providing a carrier board, wherein a surface of the carrier board has at least one probe guiding portion; and generating a probe on the probe guiding portion by performing additive manufacturing with a conductive material directly on the at least one probe guiding portion to generate the probe, wherein the additive manufacturing comprises directly layering the conductive material on the probe guiding portion.

26 Claims, 8 Drawing Sheets

(51) Int. Cl.
*B33Y 80/00* (2015.01)
*C25D 1/00* (2006.01)
*G01R 1/067* (2006.01)
*G01R 1/073* (2006.01)

(52) U.S. Cl.
CPC ..... *G01R 1/06716* (2013.01); *G01R 1/06738* (2013.01); *G01R 1/06761* (2013.01); *G01R 1/07307* (2013.01); *G01R 1/07342* (2013.01); *C25D 1/003* (2013.01); *G01R 1/06733* (2013.01); *G01R 1/06755* (2013.01); *G01R 1/07314* (2013.01)

(56) References Cited

U.S. PATENT DOCUMENTS

| | | | | |
|---|---|---|---|---|
| 2006/0006888 | A1* | 1/2006 | Kruglick | G01R 1/06733 324/754.16 |
| 2007/0210813 | A1* | 9/2007 | Hirakawa | G01R 3/00 324/762.01 |
| 2008/0278185 | A1* | 11/2008 | Chen | G01R 3/00 29/874 |
| 2017/0118846 | A1* | 4/2017 | Yamada | G01R 1/0466 |
| 2017/0259498 | A1* | 9/2017 | Stevens | B29C 64/106 |
| 2018/0120353 | A1* | 5/2018 | König | C25D 3/12 |
| 2018/0236758 | A1* | 8/2018 | Burgold | B33Y 80/00 |
| 2018/0267083 | A1* | 9/2018 | Wei | G01R 1/06727 |
| 2018/0294211 | A1* | 10/2018 | Bakir | H01L 24/17 |
| 2019/0004089 | A1* | 1/2019 | Tadayon | G01R 31/2889 |
| 2019/0170810 | A1* | 6/2019 | Tadayon | G01R 31/2853 |
| 2019/0293684 | A1* | 9/2019 | Numata | G01R 31/26 |
| 2019/0310287 | A1 | 10/2019 | Tadayon et al. | |
| 2020/0064373 | A1* | 2/2020 | Treibergs | G01R 31/2853 |
| 2021/0333307 | A1* | 10/2021 | Zou | G01R 1/06727 |
| 2021/0348288 | A1* | 11/2021 | Eliyahu | B22F 12/90 |
| 2022/0146549 | A1* | 5/2022 | Qasaimeh | G01Q 70/14 |
| 2022/0155344 | A1* | 5/2022 | Crippa | B33Y 10/00 |
| 2022/0364252 | A1* | 11/2022 | Ampatis | C25D 1/003 |

FOREIGN PATENT DOCUMENTS

| | | |
|---|---|---|
| JP | 2007171141 A | 7/2007 |
| JP | 2018527552 | 9/2018 |
| KR | 1020190108329 | 9/2019 |
| WO | 2016033652 A1 | 3/2016 |
| WO | 2020/257190 A1 | 12/2020 |
| WO | 2021023744 A1 | 2/2021 |
| WO | 2022/175458 A1 | 8/2022 |

OTHER PUBLICATIONS

European Patent Office, Written Opinion of the International Searching Authority for PCT/EP2022/054086, Jun. 24, 2022, six (6) pages, The Netherlands.

Ercolano, Giorgio, et al., Multiscale Additive Manufacturing of Metal Microstructures, Advanced Engineering Materials 2019, Wiley-VCH Verlag GmbH & Co. KGaA, Weinheim, Germany (2019).

Hirt, Luca, et al., Additive Manufacturing of Metal Structures at the Micrometer Scale, Advanced Materials 2017, Wiley-VCH Verlag GmbH & Co. KGaA, Weinheim, Germany (2016).

Korean Intellectual Property Office. Office Action issued Sep. 17, 2025, including English language translation, issued in connection with Korean Patent Application No. KR1020237032238 [23 pages total: Korean original (10 pages), English translation (13 pages)].

Japanese Patent Office. Office Action issued Oct. 7, 2025, including English language translation, issued in connection with Japanese Patent Application No. JP 2023-540557 [20 pages total: Japanese original (9 pages), English translation (11 pages)].

* cited by examiner

METHOD FOR PRODUCING A PROBE CARD

CROSS-REFERENCE TO RELATED APPLICATIONS

This application is a U.S. national stage entry under 35 U.S.C. § 371 of PCT International Patent Application No. PCT/EP2022/054086, filed Feb. 18, 2022, which claims priority to Swiss Patent Application No. 00176/21, filed Feb. 22, 2021, the contents of each of which are incorporated herein by reference in their entirety.

TECHNICAL FIELD

The present invention provides a method for producing a probe card, a probe card obtained by such a method and a use of a produced probe card.

BACKGROUND

Probe cards are important components and interfaces used for semiconductor wafer or IC chip to be tested by a test system, and their main functions include achieving circuit conduction and space size adaptation.

Reference is made to FIG. 1, which is a schematic structural diagram of a conventional probe card. The probe card usually includes a carrier board 90 and a probe assembly 91 (also called a probe head) mounted on the front end of the carrier board 90, The probe assembly 91 is formed by penetrating a plurality of probes 93 through two parallel guide plates 92. One end of the probe 93 is the connecting end 931 and the other end is the test end 932.

The carrier board 90 is provided with a plurality of probe connection guides 94 on one side for contacting the connecting ends 931 of the aforementioned plurality of probes 93. The arrangement of the plurality of probes 93 is usually quite dense, so the carrier board 90 is provided with a suitable space transformer. The distribution circuit 95 is used to enlarge the circuit configuration space, so that the space adaptation circuit 95 can be connected to a circuit board 96. Some manufacturers also regard the circuit substrate 96 as a part of the probe card or consider the circuit board 96 to be part of the test system.

Because the conventional probe 93 is manufactured by a traditional machining method, there may be dimensional errors during manufacturing, and there may also be height differences between the plurality of semiconductor terminals 971 on the semiconductor device 97 to be tested. Therefore, the probe 93 is usually designed to include a bending section 933 for generating appropriate elasticity. When the test end 932 of the probe 93 touches the semiconductor terminal 971 on the semiconductor under test device 97, an appropriate elastic deformation is generated in the bending section 933 such that when the plurality of probes 93 and the plurality of semiconductor terminals 971 are in contact, they will all contact despite the differences in length of the probes 93 and difference in the heights of the semiconductor terminals 971.

However, the conventional plurality of probes 93 must be accurately arranged and positioned, and the distance between the probes 93 must be maintained, so that the probe card 93 can perform normal operation for precise detection. The conventional method of simultaneously positioning the plurality of probes 93 is by piercing the plural probes 93 through two parallel guide plates 92 as described above. The assembly is relatively labor-intensive and time-consuming, easily suffers from assembly problems and deviations often occur. Errors generated during the manufacturing of the probe 93 may seriously affect the accuracy of the measurement. Secondly, there may be a problem of poor contact between the probe 93 and the probe guiding portion 94 since it is floating. In response to the miniaturization in the semiconductor industry, probe cards need to have a fine pitch. As an example micro LEDs require a very small pitch e.g. around 20 µm. Assembling between the needle 93 and the needle guide plates 92 is more difficult, the assembly quality is also difficult to maintain. All the above reasons may cause the problem of poor contact, poor impedance matching of the probe card, and an increase in the production cost of the probe card.

SUMMARY OF THE INVENTION

The main purpose of the present invention is to provide in a first aspect method for producing a probe card that can be applied to the production of probe cards, which can not only eliminate the setting of conventional needle guide plates, but also provide good electrical contacting. To achieve the above objective, a method for producing a probe card according to the present invention includes the following steps: providing a carrier board or a substrate, the surface of the carrier board, respectively the substrate, has at least one probe guiding portion; and generating a probe on the probe guiding portion by performing additive manufacturing with a conductive material directly on the at least one probe guiding portion to generate the probe, wherein additive manufacturing comprises directly layering the conductive material on the probe guiding portion.

By direct additive manufacturing of the probe on the probe guiding portion, cumbersome assembly steps such as probe mounting on the probe guiding portion, alignment steps are dispensed with. Furthermore, additive manufacturing of the probes allows for employing different materials for different sections of the probes and also to change dimensions of the probes, for example the probe diameter, which offers the advantage to create a specific behavior, in particular mechanical and/or electrical behavior at defined probe sections.

The carrier board or substrate can for example be implemented in the form of a wafer or other materials in addition to a printed circuit board (PCB), such as a multilayer organic carrier (MLO) and a multilayer ceramic carrier. (MLC), glass carrier (GLASS) or silicon interposer (Silicon interposer).

The probe guiding portion 11 is configured for providing an electrical connection of the probes with respective electric connections of the carrier board. Typically, each probe and each probe guiding portion is associated with an electrical connection of the carrier board. Thus, the probe guiding portion may be considered as a probe connection portion. In some embodiments the probe guiding portion may have a plate-like shape, in particular with a round contour. The probe guiding portion may be made from an electrical conductive material, such as copper, silver, gold palladium or other suitable conducting materials.

In some embodiments, the conductive material used for additive manufacturing of the probe may be copper, nickel or nickel alloy.

In some embodiments, the additive manufacturing is micro electroforming printing.

In some embodiments, the probe comprises a needle body and a needle tip and generating the probe by additive manufacturing includes the following steps: generating the needle body on the probe guide portion by layering, wherein the needle body includes at least one section that is not perpendicular to, e.g. which does not perpendicularly extend to, the carrier board or substrate; and generating the needle tip, onto the needle body by additive manufacturing.

In some embodiments, the needle body and the needle tip are respectively composed of conductive materials with different hardness. Preferably, the hardness of the needle tip is greater than the hardness of the needle body.

In some embodiments, the probe manufacturing method further includes the following steps, in particular for forming a layer stack on the probe, in particular the needle body: electroplating to form a surface layer, wherein electroplating is particularly performed on the surface of the probe, i.e. the growing probe, to form a surface layer on the surface of the probe. The surface layer may be different from the conductive material. For example, the surface layer may in some embodiments comprise or consist of gold, platinum, palladium, rhodium, graphene, beryllium, nickel or made of other suitable conductors and other materials.

Additionally, or alternatively, the probe manufacturing method further includes in some embodiments one or more of the following deposition techniques in particular to form a surface layer or layer stack on the probe, in particular the needle body: evaporation, sputtering, atomic layer deposition or any other physical or chemical deposition technique. The formed surface layer may in some embodiments be an additional surface layer, i.e. another surface layer as the surface layer generated by electroplating.

The layers may comprise or consist of gold, platinum, palladium, rhodium, graphene, beryllium, nickel or be made of other suitable conductors and other materials. Such layers are beneficial in regard of mechanical performance of the probe, electrical conductivity and electrical contacting ability.

In some embodiments, the needle tip and the needle body are made of different materials. Alternatively, the needle tip and the needle body are made of the same materials.

In some embodiments, the needle body and optionally the needle tip comprises a helical structure. The helical structure may for example comprise one or more coils. In some embodiments, the helical structure may be a spring. Typically, the helical structure extends from the carrier board and/or the probe guiding portion.

In some embodiments, the needle body of each probe comprises multiple legs, preferably at least three legs, more preferably three legs. Such embodiments are beneficial, as multiple legs, provide a self-centering of the respective probe, in particular of the needle tip, which thus increases the accuracy. It is understood that the legs are typically in direct contact with the probe guiding portion and extend vertically from the probe guiding portion towards the needle tip.

In some embodiments, the at least one section of the needle body that is not arranged perpendicular to the carrier board is elastic, e.g. shows elastic behavior. Thus, the probe is resilient, which allows to compensate between height differences between different probes and between the probe and the target contact pads.

In some embodiments, direct layering the conductive material on the probe guiding portion is repeated multiple times at different locations on the probe guiding portion or on multiple different probe guiding portions of the carrier board to generate multiple probes. Such embodiments allow for generating a plurality of probes on a carrier board. Typically, one probe guiding portion is connected to a single probe. Thus, for a carrier board, the number of probe guiding portions may be equal to the number of probes.

In some embodiments, the distance between two directly adjacent probes, in particular between their respective needle tips, is 10 µm to 1000 µm, preferably between 10 µm to 60 µm.

In some embodiments, the generated probe is coated with a coating material, wherein the coating material is different from the conductive material from which the probe is generated. The coating material may for example have a different electrical conductivity as the conductive material, a different hardness and/or other different material properties.

In a second aspect, a probe card is provided being preferably manufactured by a method according to any of the embodiments described herein. The probe card comprises a carrier board with at least one probe guide portion and a probe made from a conductive material, wherein the probe and the probe guide portion are directly materially bonded to each other. It is understood that the directly materially bonded probe guide portion and probe are bonded directly to each other, i.e. without an additional adhesive. The connection is typically only achieved by material bonding.

In some embodiments, the probe comprises a needle body and a needle tip, wherein the needle body includes at least one section that is not arranged perpendicular to the carrier board.

In some embodiments, the at least one section of the needle body that is not arranged perpendicular to the carrier board is elastic.

In some embodiments, the needle body and optionally the needle tip comprises a helical structure.

In some embodiments, the needle body comprises multiple legs, preferably at least three legs, more preferably three legs.

In some embodiments, the carrier board comprises multiple probe guide portions and multiple probes, wherein each of the multiple probes is directly materially bonded, in particular adhered, to one of the probe guide portions. Typically, each probe guide portion may be materially bonded, in particular adhered, to only a single probe.

In some embodiments, the distance between two directly adjacent probes, in particular between their respective needle tips, is 10 µm to 1000 µm, preferably between 10 µm to 60 µm.

In some embodiments, wherein the probe comprises a coating of a coating material being different from the conductive material.

A third aspect of the invention comprises the use of a probe card according to any of the embodiments as described herein for waver testing, in particular for semiconductor waver testing.

Compared with the prior art, the present invention uses three-dimensional printing to directly generate probes by layering on the probe guide portion, which can eliminate the setting of conventional needle guide plates and at the same time provide good detection results. In addition, the probe and the probe conducting part can produce a good and stable electrical connection effect. Secondly, by three-dimensional printing, it is easy to directly build up probes of various lengths, pitches, sizes or shapes on the same carrier board/substrate, so that there are two or more probes on the same probe card to achieve various semiconductor device pads/bumps with the best performance and better detection results. Furthermore, the technology of 3D printing, respectively additive manufacturing, can reach a thickness of less than 1000 µm each time, and even a thickness of 0.2 µm. Therefore, when the probe is directly laminated through 3D printing, it will have high accuracy with minimized variance advantages. In addition, in response to the problem of impedance mismatch in semiconductor high-speed testing, the implementation of the present invention can provide a probe with a controlled shorter distance, and a more stable structure than the prior art to improve impedance. The enhancement with present invention can be applied to various semiconductor industries that require high-speed testing.

DETAILED DESCRIPTION OF THE FIGURES

Figure 1:
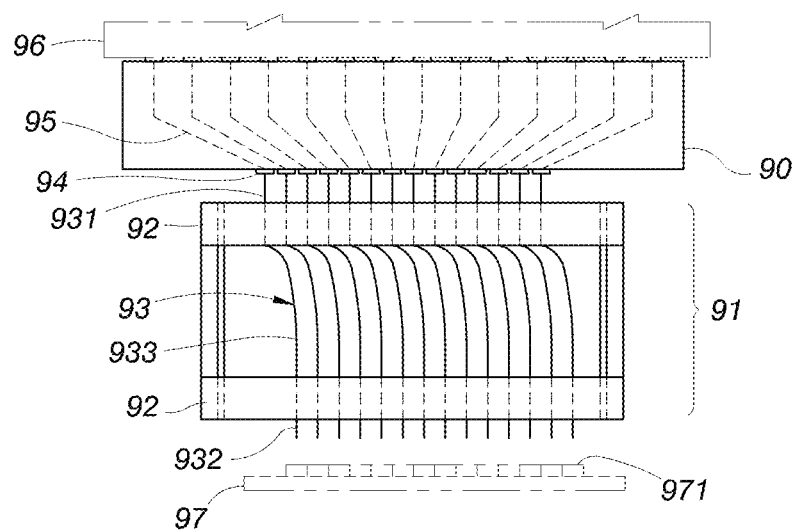
FIG. 1 is a schematic diagram of the structure of a conventional probe card.
Figure 2:
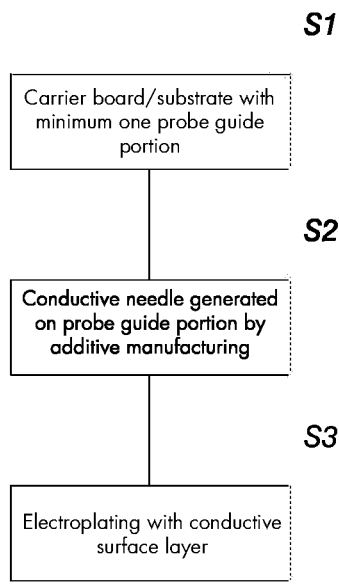
FIG. 2 is a schematic diagram of the probe manufacturing method according to the first embodiment of the present invention.
Figure 3:
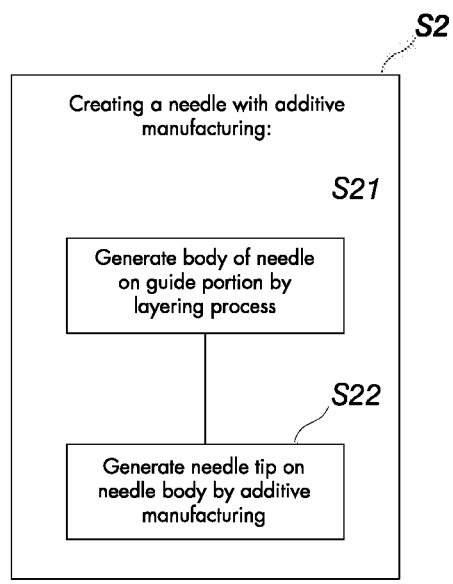
FIG. 3 is a schematic diagram of the steps of building a probe in the first embodiment of the present invention.

Referring to FIGS. 1 to 3, the probe manufacturing method shown in an embodiment includes the following steps:

Step S1: Provide a carrier board or substrate 10, the surface of the carrier board or substrate 10 has at least one probe guide portion 11;

Step S2: Generating a probe, i.e. a conductive needle, on the probe guiding portion by performing additive manufacturing with a conductive material directly on the at least one probe guiding portion to generate the probe, wherein additive manufacturing comprises directly layering the conductive material on the probe guiding portion; and Step S3: electroplating to generate a surface layer 30, i.e. a conductive surface layer, electroplating is performed on the surface of the probe 20, so that a surface layer 30 is formed on the surface of the probe 20.

Step S2 shown an embodiment as follows: the step of generating the probe by additive manufacturing includes the following steps:

Step S21: Generating a needle body 21a on the probe guide portion by layering, wherein the needle body includes at least one section 21a that is not arranged perpendicular to the carrier board; and Step S22: Generating a needle tip 22 onto the needle body 21 by additive manufacturing.

Figure 4:
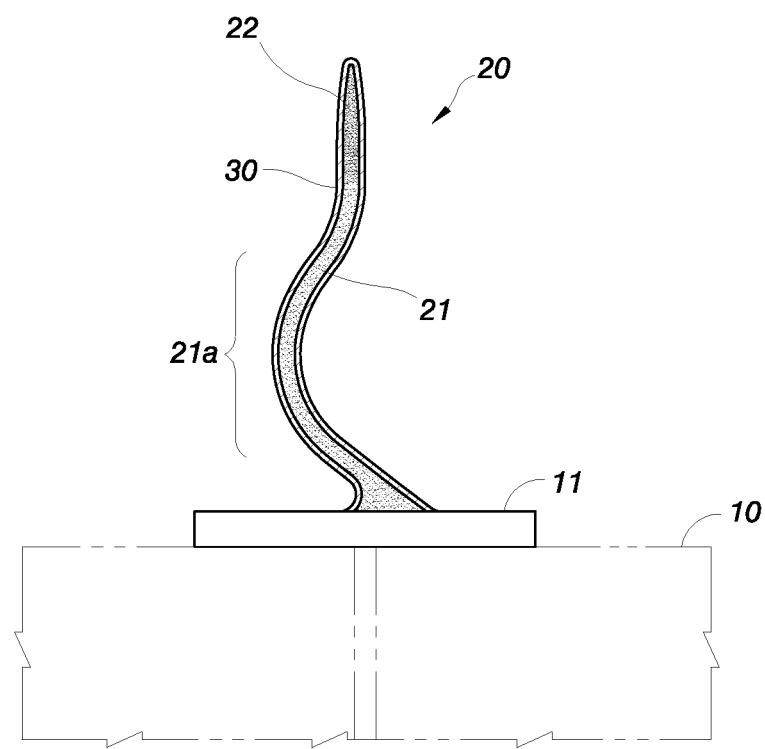
FIG. 4 is a cross-sectional view of the probe of the first embodiment of the present invention.

As shown in the FIG. 4, the main function of the carrier board or substrate 10 is to convert the space transformer with connecting the electricity paths by the adapter circuits so that the probe 20 can be indirectly connected to the test system. The carrier board or substrate 10 can be implemented in the form of a wafer or other materials in addition to a printed circuit board (PCB), such as a multilayer organic carrier (MLO) and a multilayer ceramic carrier. (MLC), glass carrier (GLASS) or silicon interposer (Silicon interposer). The probe 20 is provided to generate the required probe guiding portion 11, and the probe 20 can in general be indirectly connected with the test system through the internal conversion adapter circuit. Since the probe 20 is a direct three-dimensional printing layer generated on the probe guide portion 11, there will be sufficient contact with the probe guide portion 11, and there will be no problems of poor contact or insufficient contact area. Three-dimensional printing can use micro-electroforming printing to build up the probe 20 in layers.

Since the technology of 3D printing can reach a thickness of 1000 μm or less, even down to a thickness of 0.2 um, when the probe 20 is generated directly through 3D printing, it will have the advantage of high precision with low variance. In addition, in response to the problem of impedance mismatch in semiconductor high-speed testing, the implementation of the present invention can provide a probe 20 with a controlled shorter distance, and a more stable structure than the prior art. The enhancement of present invention is applied to various semiconductor industries that require high-speed testing.

In implementation, the needle body 21 and the needle tip 22 can be three-dimensionally printed with conductor materials with different hardness, so that the hardness of the needle tip 22 is for example greater than that of the needle body. The purpose is to provide a more resilient needle body 21. The elastic force provides better abrasion resistance and deformation resistance of the needle tip 22. Secondly, the aforementioned step S3 is used for electroplating to form the material of the surface layer 30, which is better than the conductor material used in step S2 to build up a probe 20. For example, the probe 2 can be made of copper, nickel or nickel alloy, the difference between the needle body 21 and the tip 22 can be adjusted by the nickel content or the mixed type of nickel alloy or an entirely different material, and the surface layer 30 can be gold, platinum, palladium, rhodium, graphene or made of other good conductors and other materials. (The surface layer 30 is located on the surface of the probe 20. The following description will omit the labeling of the surface layer 30 to avoid misunderstanding of the symbols of various components.)

Figure 5:
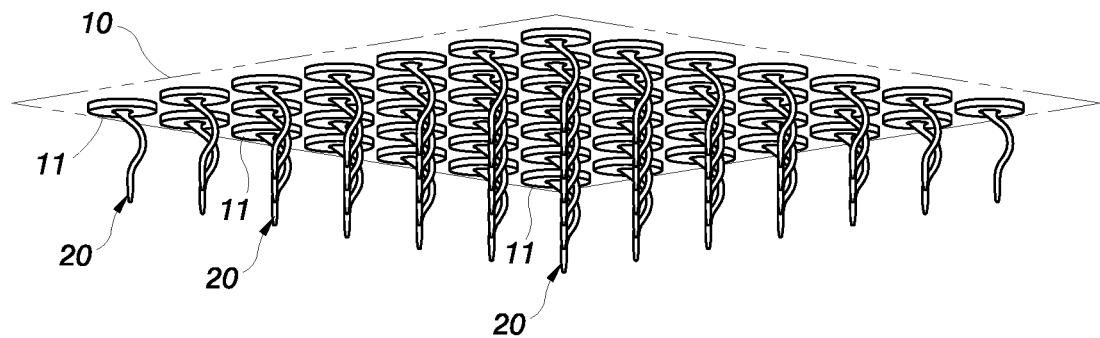
FIG. 5 is a schematic diagram of the probe array according to the first embodiment of the present invention.
Figure 6:
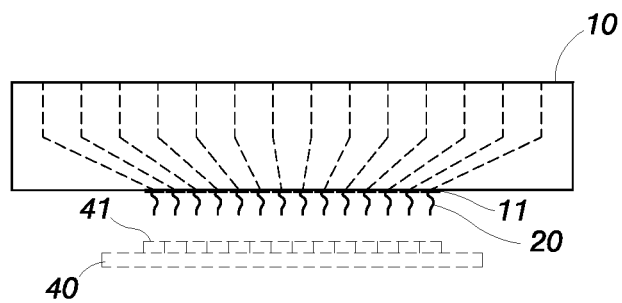
FIG. 6 is a schematic diagram of the first embodiment of the present invention applied to a probe card.

In the following, reference is made to FIGS. 5 and 6. Because 3D printing has the advantages of high precision and direct molding, it is very suitable for miniaturization, high density, and large number of repeated build-up processing. Easily complete the generation of the plurality of probes 20 and is directly arrange them into the required array form to correspond to the semiconductor terminals 41 of the semiconductor device 40 to be tested. As the plurality of probes 20 is directly arranged on the probe guiding portions 11 of the carrier board 10, an additional step of attaching probes 20 on the carrier board 10 is dispensed with, thereby providing a more efficient production process and reducing the production cost.

Figure 7:
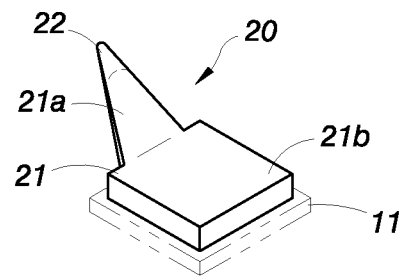
FIG. 7 is a schematic diagram (1) of the probe shape change of the first embodiment of the present invention.

Probe 20 shown in FIG. 7 has a different shape than the probe shown in FIG. 4. The needle body 21 is arranged on probe guide portion 11 by additive manufacturing, and the bottom end of the needle body 21 has a base 21b. An elastic section 21a extends vertically and diagonally above the base 21b, onto which tip 22 is printed. It is generated at the end of the elastic section 21a, so as to generate a better connection area between the base 21b and the probe guiding portion 11.

Figure 8:
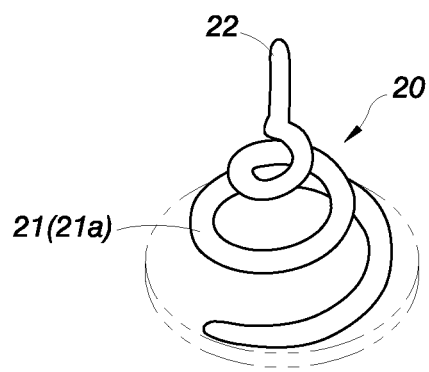
FIG. 8 is a schematic diagram (2) of the probe shape change in the first embodiment of the present invention.

FIG. 8 shows another probe 20 produced according to an embodiment of the method according to the invention. The probe 20 shown in the FIG. 8 has a different shape than the probe shown in FIG. 4. Needle body 21 is generated by additive manufacturing on probe guide portion 11, the elastic section 21a has a helical structure and covers essentially the entire needle body 21. Needle tip 22 is generated by additive manufacturing on the end of the needle body 21, to produce a better elastic effect through helical elastic section 21a.

Figure 9:
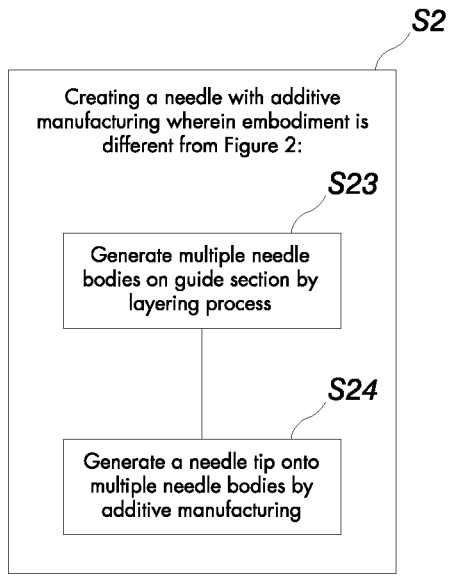
FIG. 9 is a schematic diagram of the steps of building a probe in the second embodiment of the present invention.
Figure 10:
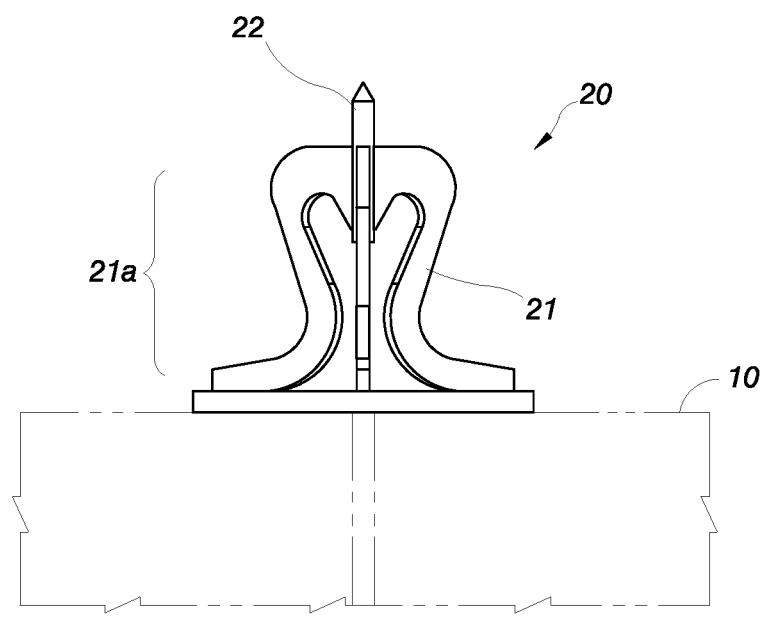
FIG. 10 is a side view of the probe of the second embodiment of the present invention.
Figure 11:
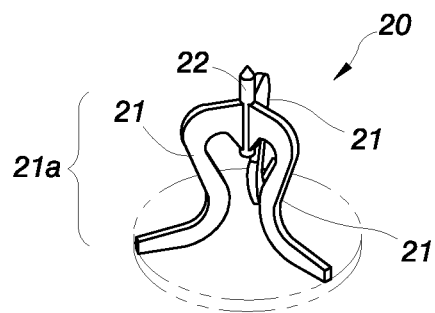
FIG. 11 is a perspective view of the probe of the second embodiment of the present invention.

FIGS. 9 to 11 are schematic diagrams of the steps of building a probe according to another embodiment of the present invention. This embodiment also includes step S1, Step S2 and Step S3. However, the embodiment is different from the embodiment shown in FIG. 2 in that the step of generating a probe layer by layer includes the following steps:

Step S23: A plurality of needle bodies 21 are generated by direct additive manufacturing on the probe guide portion 11, and each needle body 21 of the plurality of needle bodies 21 includes at least one elastic section 21a that is not perpendicular to the carrier board 10; and Step 24: Generating a needle tip 22 by additive manufacturing onto the plurality of needle bodies 21 to generate the corresponding needle tips 22.

A plurality of needle bodies 21 generated such that an S-shaped shaped elastic section 21a of the needle body is provided. A plurality of joint regions can be formed between the probe guide portion 11 and the structure stress can be enhanced. To improve the overall conductive effect, a needle tip 22 is formed on the plural needle bodies 21 so that the plural needle bodies 21 can be fixed thereto. When the needle tip 22 subjected to force, the pressure can be evenly distributed to the needle bodies 21, and each needle body 21 can provide elastic deformation thereby entailing retraction of the needle tip 22. This makes the probe 20 more robust and durable, and also has a good detection effect. Such a structure and function of probe 20 cannot be manufactured by traditional methods. This embodiment can further prove that the present invention directly uses a conductive material on the probe connecting portion 11 to generate a probe by three-dimensional printing layer. The technology of 20 can provide a probe 20 with a more complicated structure change and a more delicate design.

Figure 12:
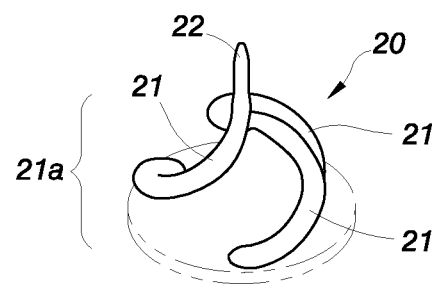
FIG. 12 is a schematic diagram (1) of the probe shape change in the second embodiment of the present invention.

FIG. 12, which is the probe 20 produced according to the method shown in the second embodiment, the probe 20 shown in FIG. 12 comprises a needle body 21 including three legs. Section 21a further comprises a helical structure and covers the entire needle body 21.

Figure 13:
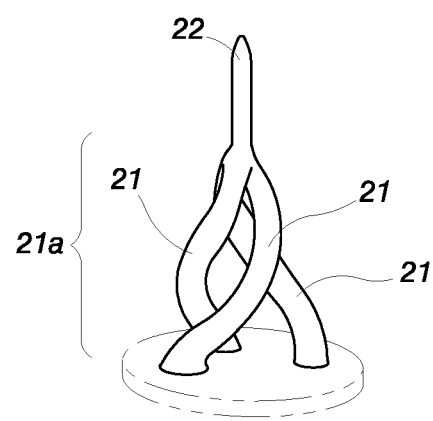
FIG. 13 is a schematic diagram (2) of the probe shape change of the second embodiment of the present invention.

Probe 20 shown in FIG. 13 has needle body 21 similar to the probe shown in FIG. 12, which also comprises three legs. Section 21a comprises a helical structure and covers essentially the entire needle body 21. The main difference lies in the length of the needle body 21 and the helical shape of elastic section 21a. The position of the needle tip 22 at the end of the plural needle bodies 21 is changed, the overall length of the probe 20 and the inclination angle of section 21a is different, which will profoundly influence the resilient behavior of the needle.

Figure 14:
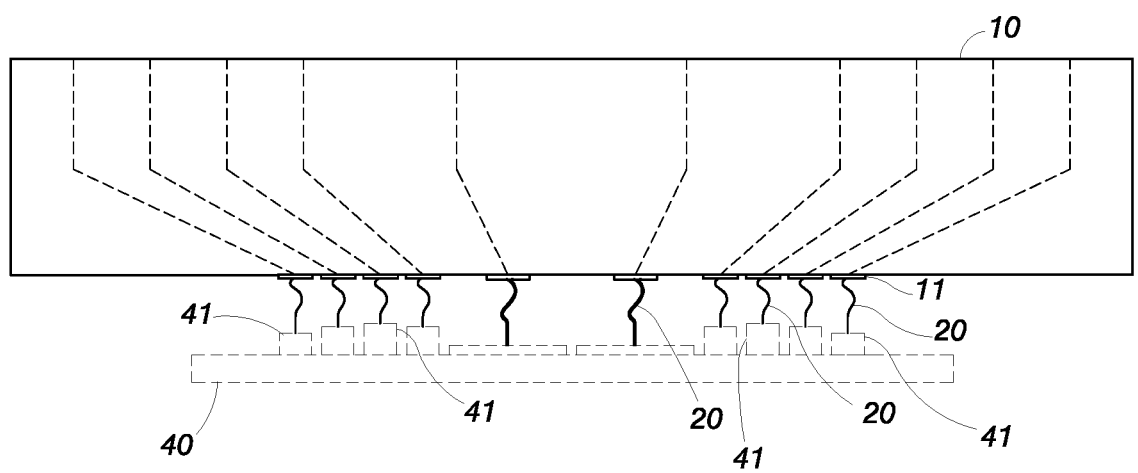
FIG. 14 is a schematic diagram of the multi-probe implementation of the third embodiment of the present invention.

FIG. 14 shows probes 20 of various lengths, spacing, sizes or shapes directly manufactured on the same carrier board 10. Compared with the general implementation of FIG. 1 in which a plurality of probes 20 of a single length, a single size, or a single shape are combined in an array, this embodiment can overcome problems of the prior art occurring when the semiconductor terminals 41 on the surface of the semiconductor device 40 to be tested are arranged with different heights or with different pitches. A probe card according to the invention may comprise probes 20 of various lengths, spacing, sizes or shapes on the same carrier 10 directly by additive manufacturing, so that there are two or more types on the same carrier 10. Additionally, or alternatively, by providing elastic or resilient probes, height differences can be accommodated for.

The above are only examples to illustrate the preferred embodiments of the present invention, and are not intended to limit the scope of implementation. All simple replacements and equivalent changes made in accordance with the scope of the patent application of the present invention and the contents of the patent specification. All belong to the scope of patent application of the present invention.

SYMBOL DESCRIPTION

10 . . . carrier board
11 . . . probe guiding portion
20 . . . probe
21 . . . needle body
21a . . . section of the needle body
21b . . . base of the needle body
22 . . . needle tip
30 . . . surface
90 . . . carrier board
91 . . . probe assembly
92 . . . guide plate
93 . . . probe
931 . . . connecting End
932 . . . test side
933 . . . bending section
94 . . . probe connector
95 . . . space adaptation circuit
96 . . . circuit board
97 . . . semiconductor device under test
971 . . . semiconductor terminal
40 . . . semiconductor device
41 . . . semiconductor terminals

The invention claimed is:

1. A method for producing a probe card, the method comprising the steps of:
   providing a carrier board, wherein a surface of the carrier board has at least one probe guiding portion;
   generating a probe on the at least one probe guiding portion by performing three-dimensional printing with a conductive material directly on the at least one probe guiding portion to generate the probe, wherein the three-dimensional printing comprises directly layering the conductive material on the at least one probe guiding portion and the probe comprises a surface; and
   performing electroplating on the surface of the probe to generate a surface layer on the surface of the probe.

2. The method according to claim 1, wherein the three-dimensional printing is micro electroforming printing.

3. The method according to claim 1, wherein the probe comprises a needle body and a needle tip and wherein the step of generating the probe by three-dimensional printing includes the following steps:

a. generating the needle body on the probe guide portion by layering, wherein the needle body includes at least one section that is not arranged perpendicular to the carrier board; and
b. generating the needle tip onto the needle body by three-dimensional printing.

4. The method according to claim 3, wherein the needle body and the needle tip are respectively made of conductive materials with different hardness.

5. The method according to claim 4, wherein the hardness of the needle tip is greater than that of the needle body.

6. The method according to claim 3, which further includes forming an additional surface layer or a layer stack by evaporation, sputtering, and/or atomic layer deposition.

7. The method according to claim 3, wherein the needle body and optionally the needle tip comprises a helical structure.

8. The method according to claim 3, wherein the needle body comprises multiple legs.

9. The method according to claim 8, wherein the needle body comprises three legs.

10. The method according to claim 3, wherein the at least one section that is not arranged perpendicular to the carrier board is elastic.

11. The method according to claim 1, wherein direct layering the conductive material on the probe guiding portion is repeated multiple times at different locations on the probe guiding portion or on multiple different probe guiding portions of the carrier board to generate multiple probes.

12. The method according to claim 11, wherein the distance between two directly adjacent probes, in particular between their respective needle tips, is 10 μm to 1000 μm.

13. The method according to claim 12, wherein the distance between two directly adjacent probes, in particular between their respective needle tips, is between 10 μm to 60 μm.

14. The method according to claim 1, wherein the generated probe is coated with one or more coating material, wherein the coating material is different from the conductive material from which the probe is generated.

15. A probe card manufactured by a method according to claim 1, the probe card comprising a carrier board with at least one probe guide portion and a probe made from a conductive material by three-dimensional printing, wherein the probe and the probe guide portion are directly materially bonded to each other, and wherein a surface layer is electroplated on a surface of the probe.

16. The probe card according to claim 15, wherein the probe comprises a needle body and a needle tip, wherein the needle body includes at least one section that is not arranged perpendicular to the carrier board.

17. The probe card according to claim 16, wherein the at least one section of the needle body that is not arranged perpendicular to the carrier board is elastic.

18. The probe card according to claim 16, wherein the needle body and optionally the needle tip comprises a helical structure.

19. The probe card according to claim 16, wherein the needle body comprises multiple legs.

20. The probe card according to claim 19, wherein the needle body comprises three legs.

21. The probe card according to claim 15, wherein the carrier board comprises multiple probe guide portions and multiple probes, wherein each of the multiple probes is directly materially bonded to one of the guide portions.

22. The probe card according to claim 21, wherein the distance between two directly adjacent probes, in particular between their respective needle tips, is 10 μm to 1000 μm.

23. The probe card according to claim 22, wherein the distance between two directly adjacent probes, in particular between their respective needle tips, is between 10 μm to 60 μm.

24. The probe card according to claim 15, wherein the probe comprises a coating of one or more coating material being different from the conductive material.

25. The probe card according to claim 15, wherein the probe card is used for wafer testing.

26. The probe card according to claim 15, wherein the surface layer is made from a material which is a better conductor than the conductive material which is used for layering on the probe guiding portion.

* * * * *